July 5, 1932.  W. H. LOLLEY  1,866,167
SHOCK ABSORBER
Filed July 22, 1929   3 Sheets-Sheet 1

INVENTOR
William H. Lolley
BY Louis Illmer
HIS ATTORNEY

July 5, 1932. W. H. LOLLEY 1,866,167
SHOCK ABSORBER
Filed July 22, 1929 3 Sheets-Sheet 2

INVENTOR
William H. Lolley.
BY Louis Illmer
HIS ATTORNEY

July 5, 1932.  W. H. LOLLEY  1,866,167
SHOCK ABSORBER
Filed July 22, 1929   3 Sheets-Sheet 3

INVENTOR
William H. Lolley
BY
Louis Illmer
HIS ATTORNEY

Patented July 5, 1932

1,866,167

UNITED STATES PATENT OFFICE

WILLIAM H. LOLLEY, OF BUFFALO, NEW YORK

SHOCK ABSORBER

Application filed July 22, 1929. Serial No. 380,141.

This invention in its broader aspects, relates to hydraulic stabilizing means adapted to provide for a buffer-like cushioning action between two relatively movable members, and more specifically, pertains to a dash-pot style of shock absorber that is primarily applicable to motor driven vehicle purposes and intended to check the throw of the car body with respect to its chassis understructure; my device is particularly applicable to modern motor cars that are equipt with suspension springs possessing a high degree of flexibility.

The present shock absorber is of the oil-filled cylinder and bypassed piston type and is so devised that its reciprocative piston-like member offers only a moderate resistance to vehicle spring flexure whenever the wheel axle is forced upwardly to a limited extent toward its superimposed body. In the event however, that any abnormal axle movement should occur because of road irregularities, my control appurtenances are designed to adequately intensify said initial restraining action prior to reaching the end of such longer abnormal stroke movement; any violent impact between the spring buffer pads is thereby prevented. Upon rebound, the accompanying reversal of piston movement is made to set up a relatively stiff counter resistance that effectively checks the resulting body throw; such restraining action in turn, abates rapid oscillation by tending to gradually return the body into its normal static position, and otherwise imparts the desired soft riding qualities to the car.

My device is adapted to be directly connected between the spring suspended car frame and its wheel axle through complementary universal joints of the buffer type without need of an intermediary actuating lever. In addition, the piston displacement is purposely kept relatively large so as to admit of working with comparatively low hydraulic pressure.

The primary object of my improvements is to devise a simple, durable and self-contained shock absorber of the character indicated and one capable of being fabricated at a comparatively low cost and that is readily applicable to a new automobile or truck equipment without necessitating any extensive changes in the prevailing structure thereof.

A further feature of the present invention resides in an improved equalized bracket disposition for mounting the drive gear of my reciprocative type of hydraulic shock absorber, which is contrived to overcome certain limitations inherent in the application of universal joints of the tiltable buffer block type. Instead of excessively tilting the buffer medium toward one and the same extreme direction, the drive gear herein is so arranged that none of the flexible joint parts will be subjected to undue distortion or abnormal wear, particularly so when the hydraulic cylinder is placed in oblique alignment with respect to the major axes of the vehicle body which it is intended to serve. Such inclined cylinder disposition further permits of a large degree of movement between the vehicle body and its supporting axle without need of having to impart a correspondingly long piston stroke to my improved shock absorber.

To this end and the accomplishment of other new and useful results, said invention further consists in an improved piston-like valve disposition, a novel equalized installation applicable to either the front and rear universal joint drives for my devices, and in other structural features, all of which will hereinafter be more fully set forth.

Reference is had to the accompanying three sheets of drawings which are illustrative of a specific embodiment of my invention, particularly as applied to automotive purposes, in which like characters of reference indicate like parts, and in which:

Fig. 1 is a fragmental elevational view taken in transverse section through the chassis of a motor-driven vehicle to show my assembled shock absorber applied in tilted relation between one end portion of the front axle and the body frame portion, while

Figure 4:
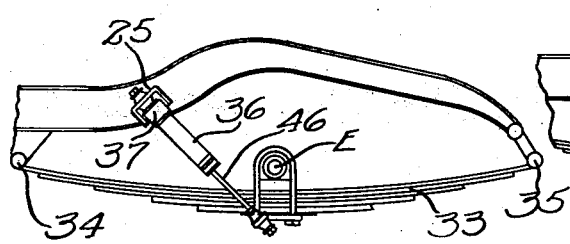
Figure 5:
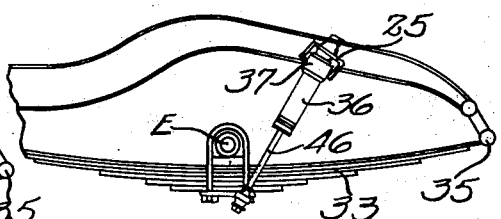

Figs. 4 and 5 schematically outlines alternative ways in which the such angular rear mounting may be carried out.

Figures 2, 3:
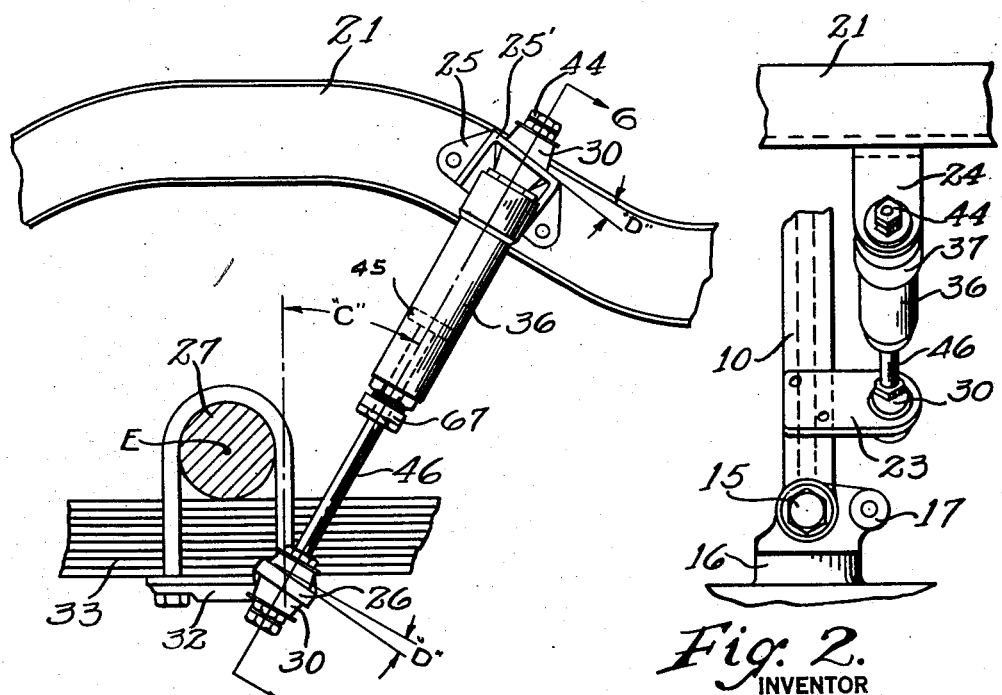
Fig. 2 is a top view thereof.
Fig. 3 shows a fragmental elevational side view of an angularly mounted rear axle installation of my shock absorber as taken in a plane at right-angles to that of Fig. 1.
Figures 6, 7, 8:
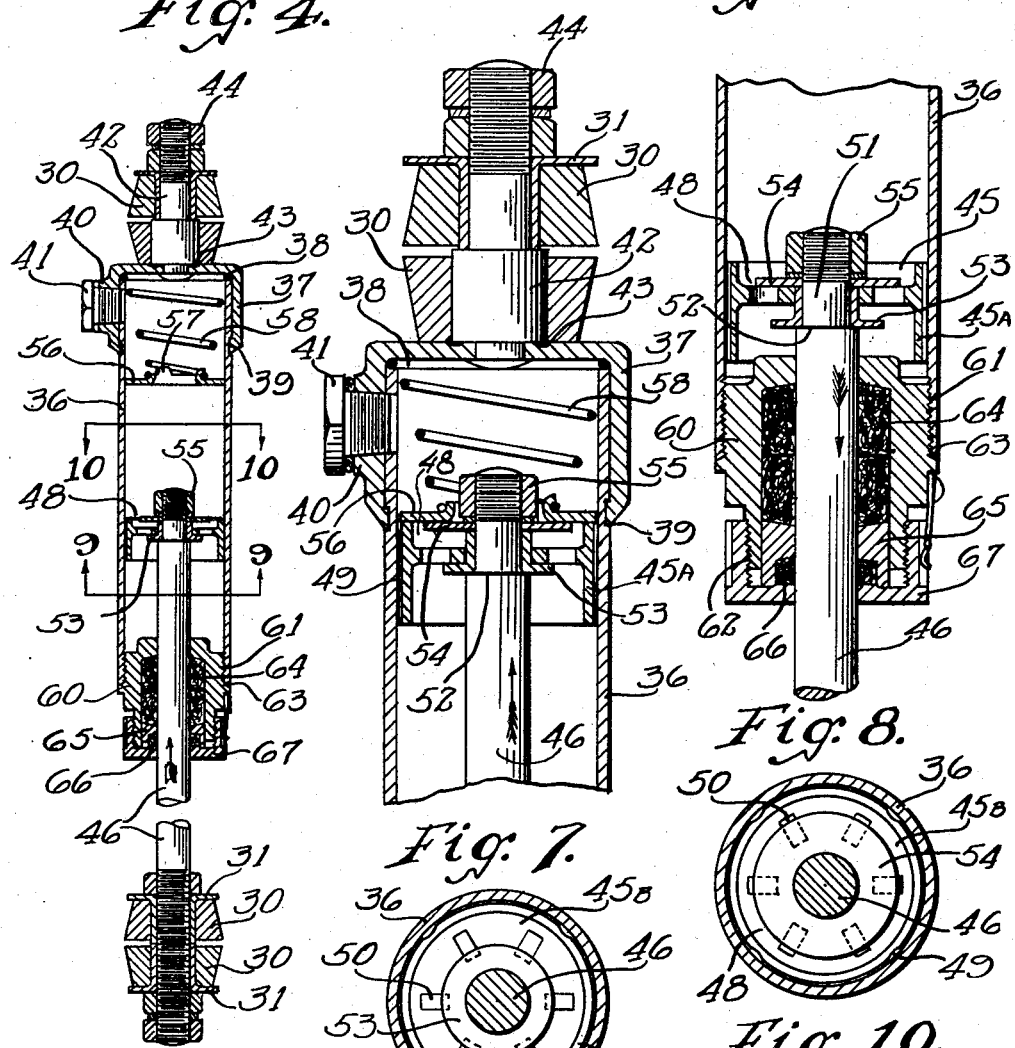

Fig. 6 represents a sectional view through the dismounted cylinder members as taken along the line 6—6 of Fig. 3 and showing the piston and its rod standing in static stroke position.

Figs. 7 and 8 respectively indicate said piston moved into opposite extreme stroke positions.

Figure 9:
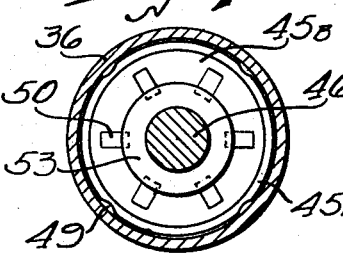
Figure 10:
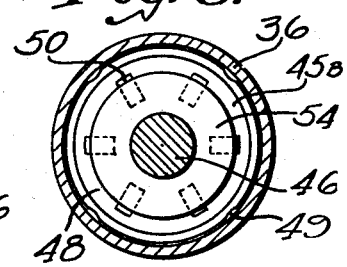

Fig. 9 illustrates a transverse sectional view as taken along line 9—9, and Fig. 10 a similar view as seen from line 10—10 of Fig. 6.

Figure 11:
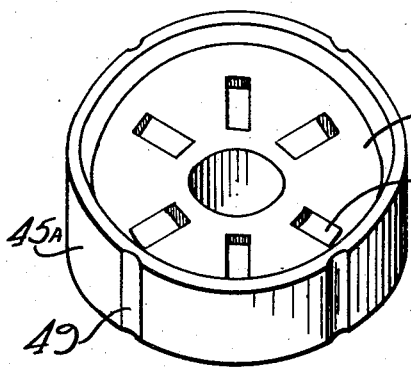
Figure 12:
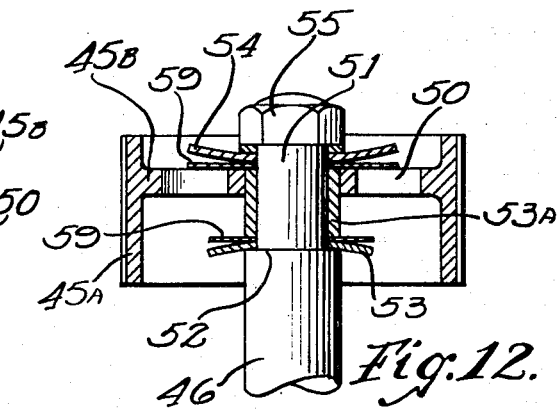

Fig. 11 is a perspective view of my floating piston-like member, and Fig. 12 is an enlarged sectional assembly thereof as equipt with pressure relief devices.

Figure 13:
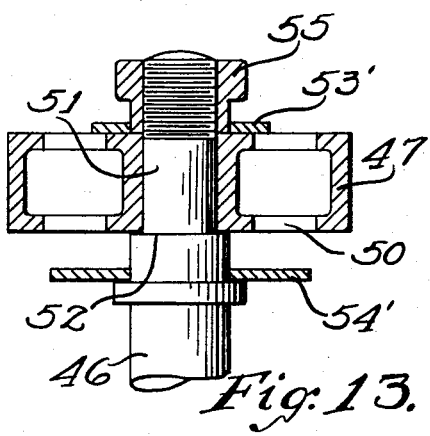

Fig. 13 shows a modified piston structure.

Figure 14:
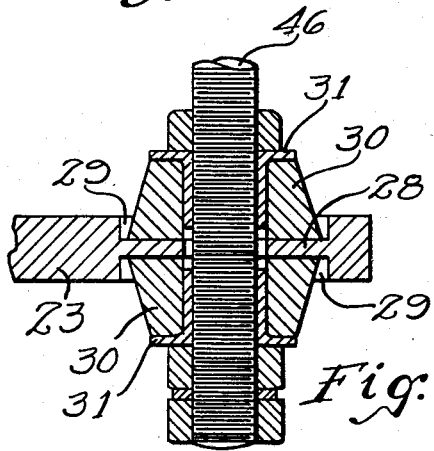
Figure 15:
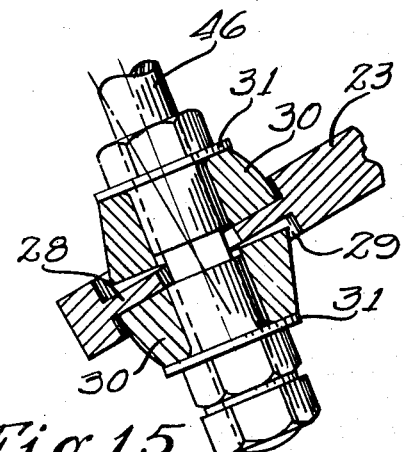

Fig. 14 represents a sectional view of my resilient universal joint as used to mount the shock absorber in place while Fig. 15 shows this joint cocked with respect to normal position and its blocks fully distorted.

Figure 16:
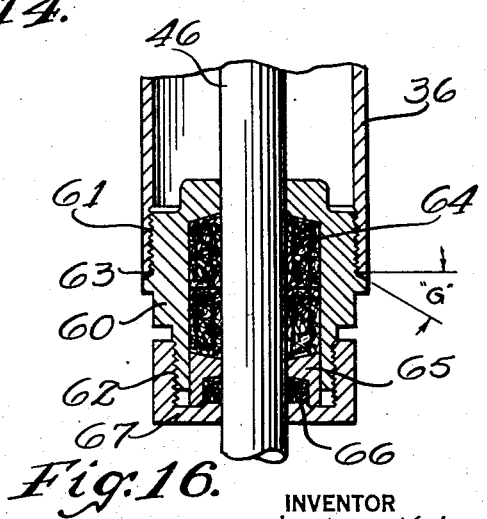

Fig. 16 details my improved stuffing box structure which seals the piston rod against oil leakage.

Figure 1:
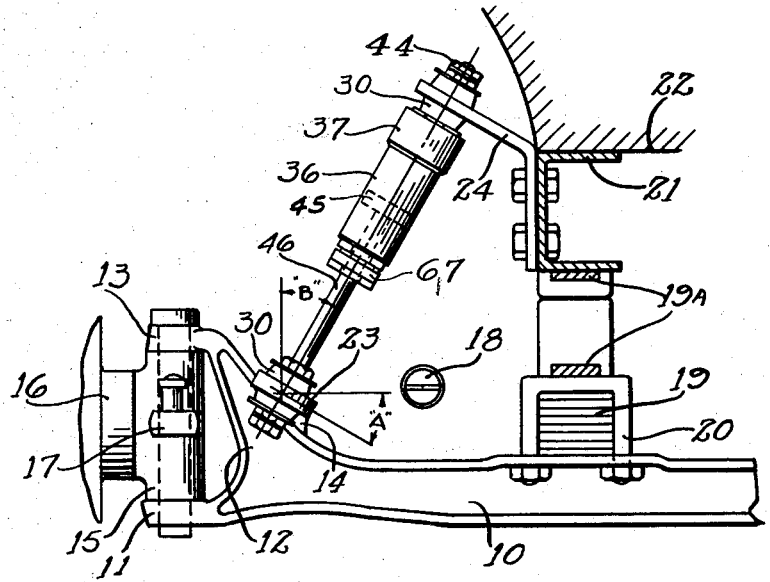

Proceeding now to a description of the drawings, Fig. 1 is intended to schematically indicate certain conventional motor car elements indirectly associated with my shock absorber, such as a front axle 10 which may have its end portions forked at 11 and the flanged yoke 12 which may be provided with the offset reenforcing boss 14 or similar attaching means. Between the fork ends there is shown mounted a king pin and knuckle mechanism 15 which engages the wheel hub 16 in a conventional manner. The steering arm 17 is usually linked to the steering rod 18 and carried rearward to the steering column (not shown).

As will be understood, each of the axle ends is similarly equipt; mounted inwardly from the respective forks, are shown complementary front leaf springs 19 of the semi-elliptic type which springs are here longitudinally disposed and each centrally held in place by separate U shaped clips 20. The spring ends may be pivotally attached to the complementary frame channels 21 in any suitable manner.

The vehicle body portion indicated as 22, is carried by said channels and a buffer pad 19A may be provided for either or both the bottom frame flange and the top leaf of the vehicle spring, which pad or pads are adapted to become operative whenever the axle too closely approaches said body.

Taking up now the installation or mounting of my complementary front shock absorbers, a lower front bracket 23 may be secured to the front axle boss 14 substantially as shown in Fig. 1. There may be similarly attached to the frame, an angular top front bracket 24; the respective free flat ends of said complementary strap-like brackets are disposed in substantial parallelism, although given an oblique disposition with respect to the major axes of the vehicle body. In static or unload raised body position, said flat bracket ends are initially made to assume the designated angle "A" as measured with respect to the horizontal wheel axis while the interconnecting cylinder axis of my shock absorber is preferably given a somewhat smaller equalized angularity designated "B" as taken with respect to a vertical plumb line.

The purpose of such compensated angular disposition or mounting will hereinafter be more fully explained. The pair of front shock absorber cylinders are herein disposed to lie in a common transverse plane with their respective lowermost ends set outwardly away from the center of the body while the respective uppermost cylinder ends are tilted inwardly toward the body, rather than mounted in the conventional vertical fashion. Such tilted installation gives to my shock absorber the maximum of lever purchase in taking up body side sway when speeding around a sharp turn or the like, while the close adjacency of the lower bracket 23 to the king bolt serves to reduce axle whip when running over a rough wavy roadbed.

The shock absorbers associated with the rear axle are preferably but not necessarily given a somewhat different disposition; as shown in Figs. 3 to 5, my cylinders here lie in a spaced parallelism but in a plane that stands in a substantially rectangular relation to the plane of the described front axle mounting. In the case of the rear suspension springs, the extreme range allowed before a buffer pad becomes operative, is usually made considerably greater than obtains for the front body springs. In order to cut down the resulting greater piston stroke and otherwise provide for a compact installation, of which no part is allowed to extend far below the lowermost spring level, I preferably set the axis of my rear shock absorber cylinders in a radial relation about the rear axle and at the considerable angular offset designated "C" in Fig. 3 as measured from the vertical plumb line.

The upper end of the respective cylinders may either be placed in a rearward or in a forward relation to the lower cylinder end carried by the axle. Fig. 5 represents an angular installation of the first named type; it is preferred however to utilize the forward mode of installation and set the cylinder axis obliquely ahead of the wheel axle in the fashion depicted in Fig. 4. By so doing, the increment of piston movement may be progressively augmented as the spring buffer pads are made to approach since this is the very time that the greatest shock absorber effect is needed. An initial offset of about 30° usually suffices to produce the desired results and by virtue of such angular setting, the piston travel may be materially reduced over that required in case the axis of my shock absorbed cylinders were placed vertically. This aspect is made more apparent by assuming the anglar offset "C" to be carried into extreme quadrature relation, when the piston would receive substantially no reciprocative movement.

Referring in further detail to Fig. 3, it will be seen that my shock absorber is likewise mounted between upper rear brackets 25 as carried by the frame 21 and the bottom rear brackets 26, the latter being here preferably secured to the clip anchor plate 32 that is associated with the rear axle 27. In the present instance, the upper bracket is shown as stamped up into a box-shape to constitute an overhanging bridge plate 25' provided with attaching ears. Said strap-iron bottom bracket may be made up as a forging or casting and disposed to laterally overhang the vehicle spring in the twisted formation indicated. The pair of rear semi-elliptic springs 33 may each be forwardly pivoted to the frame at 34 and the respective rear spring ends may be attached thereto through separate shackle link means such as 35. For reasons that will appear presently, the bracket plate 25' and also the overhung strap-like or plate portion of the lower bracket are so disposed that in a certain critical rod position they assume a substantially parallel relation that is purposely given a common tilt correction through the small angle "D" as measured with respect to a reference line drawn at right angles to the cylinder axis.

In further explanation of the peculiar movement which the axles bear to the body when any of the wheels strike a pronounced road bump or depression, it is pointed out that the device in question is ordinarily installed while suspension springs hold the body in an unloaded or static relation to the wheel axles; this intermediary reference position of the axle center is designated at "E" in Fig. 3. When the body is thrown in its uppermost or rebound position, it will then have reached its furthermost separation from either axle, and all of the reciprocative shock absorber pistons are likely to assume an extreme extended or outboard stroke position in their respective cylinder bores; owing to the accompanying deflection on part of the leaf spring 33, the rear axle will be drawn toward the forward spring pivot 34 and the attached cylinder axis will at the same time be swung about its respective bracket fastenings of the resilient type which virtually serve as trunnions. Upon return of the body toward its static position, the accompanying body overtravel will tend to cause the axle to reach the other of its relative extreme positions, thus throwing said reciprocative piston and rod in their extreme inboard or contracted stroke position. During such oscillatory body movement, the respective cylinder end fastenings will be cocked or given a rather severe twist with respect to their respective bottom and upper attachment brackets.

Provision has been made to take up the resulting twist effect by means of improved universal couplings. The preferred style of such a compensating joint is detailed in Fig. 14. The described overhanging strap-like end of each of my support brackets may be drilled and counterbored upon one or both strap sides to constitute a centered abutment or apertured web-like plate such as 28. Cooperating with the respective counterbores such as 29, are oppositely disposed non-metallic buffer or cushion blocks 30, which may be made from soft rubber, resilient fabric or like material. These blocks are preferably given a tubular cone frustrum shape with the larger or base diameter placed against one of the respective web faces and centered within its adjacent counterbore in the assembled manner indicated. As a further refinement, a metallic bushing 31 may be entered through each of the block openings and said bushing may be outwardly flanged to reenforcingly trim the cut-off apex end of said block as shown.

Each end of my shock absorber is equipt with a threaded stud-like actuating member adapted to be loosely entered through the described web plate together with the pair of resilient blocks associated therewith, and each such stud may be provided with suitable nut means serving to initially draw the respective blocks toward the interposed web. While a universal joint of this type is structurally simple and admirably suited to the intended service, long life can best be obtained when the angular joint deflection is held within well defined limits. This result is herein secured by resort to an equalized setting between the support brackets and the driven shock absorber members whereby lopsided block wear is obviated; by this means, not only is the life of my buffer blocks greatly prolonged but the described type of universal joint is made entirely practicable for meeting the wide range wrenching action to which it must necessarily be subjected when applied to driving a direct-connected and obliquely mounted cylinder.

Referring further to the defined axle travel limits that respectively correspond to said contracted and extended piston stroke positions, it is emphasized that the intermediate static axle position "E" indicated in Fig. 3, is preferably made to lie rather near to the last named extreme position so that the cylinder will ordinarily swing about the respective support fulcrums in unequal relation to its normal static position; that is to say, the angular movement required to reach extended piston stroke position therefrom is kept relatively small as compared to the opposite piston movement required to reach the extreme body throw position. In view of this characteristic difference of piston movement, my rear support brackets are purposely given the aforesaid peculiar angular inclination designated as "D" such that the upper and bottom brackets 25 and 26 will be made to stand in parallelism whenever my cylinder axis assumes a medial position that is reached when the piston rod is situated substantially mid-way between its extreme contracted and extended stroke positions.

When therefore the car occupants fully load the vehicle body, the axle and its associated shock absorber members will be carried toward a position that closely responds to said medial cylinder position for which it is desired to equalize the universal joint movement; in such medial or normal working position, the buffer block faces will assume a symmetrical relationship in which the respective web-like bracket plates 28 lie in a substantially rectangular relation to the cylinder axis, so that when the cylinder is swung into extreme position to either side thereof, the deflection and resulting maximum fatigue strain imposed upon the block material will be kept substantially equal.

In order to attain this result, the disposition of said overhanging strap portions of the upper and lower rear brackets are respectively corrected by giving them the cited initial inclined or tilted disposition. In each such limiting cylinder position, the respective bracket straps will then undergo a restricted angular distortion with respect to the stud axis as is represented in Fig. 15; this view further indicates the manner in which oppositely disposed buffer block edges may at their worst, be warped by the interposed web plate. When the cylinder is swung into the other of its extreme positions, the opposite complementary buffer block edge will come into action in a substantial reversed manner from that just described. As will be apparent, this equalized or compensated travel principle has likewise been applied to the front axle mountings that is shown in Fig. 1.

Having described the preferred mode of mounting my shock absorbers, attention will now be directed to structural details embodied within my hydraulic cylinder and the restraining action which it is capable of exerting upon the relatively movable body and axle members.

My shock absorber comprises a low pressure cylinder or casing 36 having one of its bore ends closed by a stamped built-up head cap 37 as shown in Fig. 6. The flat crown of this cap is preferably kept in spaced relation to the closed end of the cylinder to form an offset gap 38. The tubular cap skirt is snugly telescoped over said end and may be fixedly secured in place by the ring shaped weld but it is preferred to crimp or calk the overlapping cap rim edge inwardly into the retaining recess 39 as formed around the outside cylinder wall. Said skirt may further be provided with a lateral boss 40 disposed closely adjacent to the cylinder top and with a removable screw plug 41 therefor through which the cylinder may be filled with relatively thin oil or other suitable hydraulic medium having a low freezing point. The cylinder is intended to be wholly filled with such medium when the piston rod is displaced inwardly and stands in its extreme contracted position, and such cylinder supply will herein be termed "substantially filled".

The center region of the cap crown is further apertured to mount the upstanding shank 42; this shank may be attached to the cap in any suitable manner but is here shown as provided with a stem that is securely riveted into said crown aperture and additionally welded at 43. The shank body is given a diameter such that it may be freely received within the described complementary top cushion blocks 30 as shown. The outermost free terminal portion of said shank is threaded and provided with a pair of check nuts 44 serving to clamp said buffers to one of the top bracket abutment plates 28.

The open end of the cylinder is internally threaded and the free end thereof given a beveled or flared seat as fixed by the acute angle "G" (see Fig. 16). Slidably mounted within said cylinder is the reciprocative piston 45 which may be of the floating type and adapted to cooperate with its rod 46. This rod extends through the packed stuffing box 60 and the free threaded extremity of said rod is provided with suitable nuts adapted to resiliently lock said rod end to a lower axle bracket in the fashion previously described.

Referring in further detail to my floating piston structure, this is preferably provided with a circumferential wall or skirt 45A having a centrally apertured web member 45B mounted thereacross. Said web is preferably disposed intermediate the respective wall ends and as shown in Figs. 11 and 12, the periphery of said wall may have one or more by pass grooves 49 cut therealong. Said web may further be provided with a group of radial slotted ports such as 50 arranged around the piston axis; the purpose and advantage of these slots will hereinafter be more fully explained.

The rod end that mounts the piston, is reduced in diameter to form a short stud-like extension 51 of which the free end is threaded. The juncture point of said extension provides for the rod shoulder 52; adapted to rest thereon, is a circular check plate 53 which in Figs. 6 to 8 is shown as provided with an integral spacer bushing. A washer-like valve disc 54 is superimposed upon the free bushing end while the piston web is slidably mounted around said bushing in a reciprocative relation to the spaced check plate and valve disc; that is to say in the present disclosure, said valves are concentrically disposed upon opposite side faces of the piston web. The entire piston and valve assembly may be removably held in place by the rod nut 55, and it is preferred to so mount the outermost face of the fixedly held disc 54 that the latter will fall in flush alignment with the topmost edge of the tubular piston wall 45A and form an annular feed passage 48 therebetween (see Fig. 7).

When the piston is drawn toward the stuffing box end of the cylinder bore, the piston drag will cause its web 45B to lift into abutment with the valve disc 54 as shown in Fig. 8. The latter disc is given an outside diameter sufficiently large to overlappingly cover a major portion of the central region of said radial ports 50 in the manner represented in Fig. 10. An outstanding feature of this particular valve structure lies in the ease with which replacement check plates of a different outside diameter, can selectively be substituted for the one that is specifically disclosed, the intent being to definitely modify the throttling action through said web ports when the piston travels outwardly and away from the cylinder head.

In like manner, the circular check plate 53 may be selectively replaced by similar substitute plates having a changed outside disc diameter from that used for illustrative purposes. By virtue of these improved piston valve adjustments, the hydraulic resistance in either direction of piston movement may be conveniently altered to give any desired ratio of the throttling effect.

It will further be observed that the disc valve 54 is ordinarily given an outside diameter that is kept large with respect to the complementary check plate or valve 53. When the piston on its inboard stroke, travels in a direction toward the cap end of the cylinder, the web 45B of the floating piston will be thrust against the check plate 53 as indicated by Fig. 6; in so doing only a minor portion of the radially innermost port area will then be covered in the manner shown in Fig. 9. The fluid is however allowed to pass more or less freely through the remaining uncovered port area and the resulting flow resistance or throttling action at any given piston speed may be positively fixed by the selected diameter size that is given to the plate 53.

In the described cylinder arrangement, the last named plate comes into action whenever the vehicle wheel axle is made to approach the body, and during such inboard piston stroke, it is desired to keep the fluid flow resistance within moderate limits without appreciable checking effects. When however the piston is caused to move in its opposite or outboard stroke direction, a relatively high degree of flow resistance is required. Any desired suspension spring control is herein obtained by having the valve disc 54 more or less fully cover the said innermost portion of my radial ports 50 in the manner described. For best results, different weights and makes of cars require a different spring control or combination of such fluid throttling resistances, which ratio factor in practice usually ranges between 2:1 to 4:1. It is emphasized that by the use of the described radial slots such as 50, I am enabled to secure a hydraulic throttling effect that is made directly responsive to any uniform gradation or regular change in outside diameter of the valve discs 53 or 54.

In addition, my floating piston centers the liquid flow control into a single movable member. The required valve reversal is effectively assisted in proper synchronism by frictional drag on part of the piston, all of which makes for a more positive action of this fragile but vital fluid check mechanism. These working parts are so disposed that one cylinder end may be kept permanently closed by the head cap 37 and still allow the piston valve assembly to be bodily withdrawn through the opposite or stuffing box end thereof. After such removal either one or both check valves may readily be replaced without having to draw the piston rod out of its adjusted stuffing box.

My piston is further made to cooperate with a complementary restraining plate or follower member 56. This annular plate may be fitted to freely slide toward the closed head portion of my cylinder, its inner plate periphery being preferably shaped to provide for a plurality of upturned prongs 57. Said plate may be yieldably held and located in spaced relation to the flat cap head wall, by means of the conical helical spring 58 of which the large coil is shown sprung into the cap offset 38 while its free depending end is made to engage with said prongs 57. The disposition of said plate is such as to lie in the path of the piston travel where it may be struck and carried along by the piston into its extreme inbound or contracted stroke position in the manner illustrated in Fig. 7. Upon picking up the restraining plate, the center opening thereof freely telescopes over the nut 55 while its annular flat portion is made to bridgingly engage both the valve disc 54 and the upstanding piston wall portion designated as 54A.

As a result of contacting the follower plate 56, the annular feed passage 48 will become substantially closed at a time when the piston web still rests upon the check plate 53, and hence the fluid flow through the web ports 50 is abruptly shut off. Further movement on part of the piston will thereupon be energetically impeded because the flow of displaced hydraulic liquid is now restricted and must largely leak around the retaining plate periphery through the contracted piston bypass grooves 49. The desired degree of such intensified restraint may be fixed by suitably fitting the coacting piston and follower members within the cylinder bore, while the fixed point at which it is preferred to have the piston strike said follower, may be changed by altering the spring length.

Referring now to the cooperative action that is attained by the use of my shock absorber device when installed in accordance with the described disclosure, it will be seen that the piston structure is such as to initially allow the respective axles to rather freely approach the suspended body since my floating piston will at this instant be moving toward its cylinder head end; however, before the contracted piston stroke has been completed, the restraining plate 56 will have come into play and serve to more intensively check the inbound piston movement. Hence just prior to the time when the spring buffer pad 19A becomes effective, such augmented piston restraint will energetically ease any severe bumping between the chassis and the body.

At this instant, the suspension springs will be subjected to an unbalanced load, and thereupon body rebound will commence; during the accompanying reversed extension stroke, the piston will promptly withdraw from the plate 56 and the piston web will immediately become shifted into abutting relation with the valve disc 54. The relatively heavy throttling effect that is then set up through the web ports 50, serves to absorb a considerable portion of the body rebound energy; this in turn gradually, rather than rapidly, allows the suspension springs to resume their static relation. During such separation, the resulting downward oscillation is likely to carry the body amplitude somewhat beyond its static position and move the piston into its outermost extended stroke position as indicated by Fig. 8, and it is in part for this reason that my piston is initially set inwardly and away from the stuffing box end of the cylinder into static position; such piston spacing is also needed to allow for car loading. As will be understood, the piston in normal operation, does not ordinarily carry through the described extreme stroke limits but is more likely to reciprocate within rather narrow limits until some unusual road irregularity sets the body in abnormal oscillation. In the case of relatively short piston strokes, the plate 56 remains inactive.

Attention will now be directed to certain auxiliary piston valve devices designed to compensate against substantially altering the oil flow resistance due to change in viscosity when operating under different atmospheric temperatures. As represented in Fig. 12, the floating piston web 45B is shown mounted for reciprocative travel between a pair of protective guard plates such as 53 and 54. Their respective innermost backing faces are oppositely curved in profile and may be kept fixedly spaced apart by means of the separately formed spacer bushing 53A. Interposed between each such spherically faced guard and the respective adjacent bushing ends, is a laterally resilient relief valve such as 59. These relatively thin complementary valves are intended to dish outwardly away from each other and against the respective backing surfaces of their cooperating shields, which reenforcement safeguards the valves against excessive distortion and fatigue when subjected to extreme throttle pressure. Either one or both of the complementary piston valves may be thus equipt and if desired, said relief valve may also be made up into a laminated plate structure in order to facilitate its flexure; should the fluidity of hydraulic medium become altered in response to the temperature change, such auxiliary compensating discs will tend to correspondingly deflect and thereby provide for a somewhat greater or lesser freedom of flow through the piston valve port area, to the end that the cylinder pressure may be held at substantially constant intensity.

Fig. 13 shows a modified type of box piston structure 47 in that its complementary webs are rigidly secured to the piston. The piston valves, while here shown mounted in a reverse relation, may be made to function in a manner substantially identical to that described in connection with Fig. 6, except for coaction between the piston and the restraining plate 56; this latter member need not however wholly close off the piston ports 50 since such supplemental retaining plate may in fact be eliminated without effecting the more essential function of my device.

As will be obvious, my shock absorber cylinder can if desired, be likewise attached to the frame and axle members in a reversed or upside down relation to that shown and described; in this event the piston valves would be oppositely placed and the follower plate 56 disposed between the piston and the stuffing box.

It now remains to describe my preferred style of stuffing box which is especially adapted to meet the exacting service required for hydraulic shock absorber purposes. It will be understood that for satisfactory performance over a prolonged period, it is essential that a reciprocative piston rod of this kind be kept perfectly sealed against appreciable fluid leakage.

As disclosed in Fig. 16, my rod sealing means comprises a tubular stuffing box 60 that is preferably fabricated as a die casting of relatively soft metal with its innermost and outermost ends externally threaded as at 61 and 62. The innermost male thread 61 is sized to snugly fit into the free cylinder end and this thread terminates in an abutment that provides an endless shouldered seat face 63 having a bevel or rounded profile that is slightly different from the angle "G" given to the free cylinder end, the purpose being to draw said complementary faces into self sealing joint of the line contact type.

Said box is further bored out to receive one or more ring-shaped packings 64 of the cross-expansion type, as shown. Said tandem rings each preferably comprises a soft rubber or other like core medium having a rectangular cross-section that is surrounded by braiding a layer of asbestos or flax of which the fibers are preferably impregnated with a suitable lubricating substance such as graphite or the like. These rings are pressed in place by the metal gland 65 of which the forward portion is interiorly recessed to receive the wiper ring 66. The last named ring is preferably made up from braided flax packing having a copious amount of graphite held in suspension. The primary purpose of this ring is to wipe the piston rod clean and prevent foreign matter from creeping into the box, while its graphite content aids in keeping the rod lubricated in the event that leakage on part of the soft packing should fail to wholly supply this need. The described packing elements are then drawn into said box by the adjusting nut 67 which may be locked by clip or other suitable means against inadvertent rotation about the thread 62.

It is to be understood that the disclosed shock absorber mechanism also finds application to other than vehicle purposes, and that various changes in the details and mode of attachment may be resorted to in likewise carrying out my illustrative structural embodiment, all without departing from the spirit and scope of my invention, heretofore described and more particularly pointed out in the appended claims.

Claims:

1. A shock absorber comprising a cylinder substantially filled with hydraulic fluid, a reciprocative piston rod, a floating piston adapted to slip lengthwise of the rod in unison with the strokes imparted thereto, said piston including a web member having a radially slotted port therethrough, a pair of spaced disc valves detachably carried by the rod and respectively mounted upon opposite sides of said web, the respective valve perimeters being kept inwardly of the radially outermost transverse port edge and which valves alternately cooperate with the floating piston to control fluid flow therethrough.

2. A shock absorber comprising a cylinder substantially filled with hydraulic fluid, a piston rod reciprocatively associated with said cylinder, a piston floatingly carried by the rod to slip lengthwise therealong and provided with a plurality of slotted ports therethrough that are radially disposed about the rod axis, and a replaceable disc valve for each face of said piston and concentrically mounted about the rod axis, the periphery of the respective discs being of unequal size such that one such disc is adapted to commandingly cover a major portion of the piston port area when the rod is moved in one direction while the other disc commandingly covers a minor portion of said piston port area when the rod is moved in an opposite direction.

3. A shock absorber comprising a cylinder substantially filled with hydraulic fluid, a piston rod reciprocatively cooperating with said cylinder, a ported piston carried by said rod and the periphery of which piston is provided with restricted bypass groove means, a valve serving to close the piston port in one direction of piston movement but permitting of a substantially free fluid flow in the opposite direction, and a supplementary follower plate disposed in the path of piston travel serving to substantially close off fluid flow through the piston port while the piston is moving in the aforesaid opposite direction and thereupon forcing further fluid flow through said bypass means.

4. A shock absorber comprising a cylinder substantially filled with hydraulic fluid, a piston rod reciprocatively associated with said cylinder, a pair of disc valves, spacer means embracing said rod and holding said valves in spaced relation thereon, a piston-like member including a cylindrical skirt and a ported web floatingly mounted about the spacer means and between the valves, a marginal edge portion of said skirt being disposed to circumscribe one of the valves to provide for an annular feed passage therebetween, and means for closing said passage when the rod approaches one of its stroke limits, said means when closed, bridging said passage and shutting off the fluid flow through said ported web.

5. A hydraulic shock absorber comprising a cylinder, a webbed piston and a rod reciprocatively cooperating with said cylinder, a port disposed through the piston web, and a laminated valve comprising a plurality of superimposed dishable disc-like members wholly disposed upon one side of said web adapted when closed to overlappingly command said port and when opened to have its entire valve perimeter raise uniformly away from the marginal region of said port.

6. A hydraulic shock absorber comprising a cylinder, a cap having a substantially flat crown together with tubular skirt adapted to telescope over one of the cylinder ends and provide for an offset gap between the cap crown and said one cylinder end, a reciprocative piston and rod, a follower plate adapted to be struck in unison with the piston movement, and a coiled spring having one of its ends retained within said gap and which spring serves to yieldingly mount said plate within the cylinder bore.

7. A shock absorber for vehicles provided with axle means having a spring-suspended body mounted thereon and which body when standing unloaded assumes a static relationship to the axle and oscillates unequally therefrom within certain travel limits when the moving vehicle encounters road-bed irregularities, the combination of a pair of spaced actuating plate means respectively associated with the axle and said frame, a cylinder assembly including a reciprocative piston having a rod carried outwardly beyond one of the cylinder ends and which assembly is operatively mounted between said plates to alternately move the rod into extreme extended and contracted stroke positions in unison with said oscillations for passage through a critical rod position corresponding to the aforesaid static relationship and lying intermediate mid-oscillatory travel and one extreme of such travel, and complementary universal joint means of the distortable resilient type respectively interconnecting the opposite cylinder end region to one such plate and the free rod end to the other plate, said cylinder being arranged in an axially oblique relation to the road-bed and the plane of the respective plates being given a tilt correction with reference to said oblique axis such that when the rod reaches its respective extreme stroke positions, the distortion imposed upon the complementary joints will become substantially equalized.

8. A shock absorber for vehicles provided with axle means having a spring-suspended body mounted thereon and which body when standing unloaded assumes a static relationship to the axle and oscillates unequally therefrom within certain travel limits when the moving vehicle encounters road-bed irregularities, the combination of a pair of spaced actuating plate means respectively associated with the axle and said frame, a cylinder assembly including a reciprocative piston having a rod carried outwardly beyond one of the cylinder ends and which assembly is operatively mounted between said plates to alternately move the rod into extended and contracted stroke positions in unison with said oscillations for passage through a critical rod position corresponding to the aforesaid static relationship and lying intermediate mid-oscillatory travel and one extreme of such travel, and complementary universal joint means of the distortable resilient type respectively interconnecting the opposite cylinder and region to one such plate and the free rod end to the other plate, said cylinder being arranged in an axially oblique relation to the road-bed and the plane of the respective plates being given a tilt correction with reference to said oblique axis when the rod reaches its critical position and which plates assume a substantially rectangular relation to said axis when the rod is brought into its mid-stroke position.

9. A shock absorber for vehicles provided with axle means having a spring-suspended body mounted thereon and which body when standing unloaded assumes a static relationship to the axle and oscillates unequally therefrom within certain travel limits when the moving vehicle encounters road-bed irregularities, the combination of a pair of spaced actuating plate means respectively associated with the axle and said frame, a cylinder assembly including a reciprocative piston having a rod carried outwardly beyond one of the cylinder ends and which assembly is operatively mounted in an axially oblique relation to the road-bed between said plates to alternately move the rod into extended and contracted stroke positions in unison with said oscillations for passage through a critical rod position corresponding to the aforesaid static relationship and lying intermediate mid-oscillatory travel and one extreme of such travel, and complementary distortable universal joint means respectively interconnecting the opposite cylinder end region to one such plate and the free rod end to the other plate, said joints each including a pair of resilient buffer blocks that are oppositely disposed upon their respective plates and the plane of the respective plates being given a tilt correction with reference to said oblique cylinder axis when the rod stands in its critical position, substantially as described.

In testimony whereof, I have herewith set my hand this 15th day of July, 1929.

WM. H. LOLLEY.